United States Patent [19]

Yoshizawa et al.

[11] Patent Number: 5,270,932
[45] Date of Patent: Dec. 14, 1993

[54] STEERING WHEEL POSITION CONTROL APPARATUS

[75] Inventors: Takashi Yoshizawa, Tokyo; Toru Futami, Kanagawa, both of Japan

[73] Assignee: Nissan Motor Company, Limited, Kanagawa, Japan

[21] Appl. No.: 681,250

[22] Filed: Apr. 8, 1991

[30] Foreign Application Priority Data

Apr. 12, 1990 [JP] Japan .................. 2-95088

[51] Int. Cl.$^5$ .............................................. B62D 1/18
[52] U.S. Cl. .................. 364/424.05; 364/425; 280/775
[58] Field of Search ............ 364/424.05; 74/493, 74/552, 554; 280/775

[56] References Cited

U.S. PATENT DOCUMENTS

| | | | |
|---|---|---|---|
| 4,503,504 | 3/1985 | Suzumura et al. | 364/425 |
| 4,803,629 | 2/1989 | Noto et al. | 364/424.05 |
| 4,895,216 | 1/1990 | Fusimi et al. | 180/79.1 |
| 4,899,278 | 2/1990 | Yamamoto et al. | 364/424.1 |
| 4,934,737 | 6/1990 | Nakatsuka | 280/775 |
| 4,978,137 | 12/1990 | Futami et al. | 364/424.05 |
| 5,019,759 | 5/1991 | Takemura et al. | 364/424.05 |
| 5,019,981 | 5/1991 | Oshita et al. | 364/424.05 |
| 5,156,243 | 10/1992 | Aoki et al. | 192/4 A |
| 5,164,645 | 11/1992 | Furuse et al. | 364/424.05 |

FOREIGN PATENT DOCUMENTS

| | | |
|---|---|---|
| 0213482 | 3/1987 | European Pat. Off. |
| WO88/10205 | 12/1988 | PCT Int'l Appl. |
| 1389470 | 4/1975 | United Kingdom |
| 2236007 | 3/1991 | United Kingdom |

Primary Examiner—Thomas G. Black
Assistant Examiner—Tan Q. Nguyen
Attorney, Agent, or Firm—Lowe, Price, LeBlanc & Becker

[57] ABSTRACT

A reversible electric motor is coupled for moving a steering wheel of an automotive vehicle in a first direction toward an uppermost position and in a second direction toward a lowermost position. An operation device has a control member movable in first and second directions for producing a signal indicating a desired steering wheel position change corresponding to an extent to which the control member is moved and a desired direction corresponding to a direction in which the control member is moved. A control unit is responsive to the signal from the operation device for operating the electric motor to move the steering wheel in the desired direction. The control unit is arranged to set a length of time based upon the desired steering wheel position change and to operate the electric motor for the time length to make the desired steering wheel position change.

7 Claims, 7 Drawing Sheets

STEERING WHEEL POSITION CONTROL APPARATUS

BACKGROUND OF THE INVENTION

This invention relates to a steering wheel position control apparatus for use with an automotive vehicle having a steering wheel supported for movement between uppermost and lowermost positions.

Steering wheel position control apparatus have been proposed to position a vehicle steering wheel to a desired position between its uppermost and lowermost position. However, conventional steering wheel position control apparatus fail to meet antithetical requirements for quick steering wheel position change and smooth steering wheel position fine adjustment.

SUMMARY OF THE INVENTION

Therefore, it is a main object of the invention to provide an improved steering wheel position control apparatus which can satisfy requirements for quick steering wheel position change and smooth steering wheel position fine adjustment.

There is provided, in accordance with the invention, a steering wheel position control apparatus for use with an automotive vehicle having a steering wheel supported for movement between uppermost and lowermost positions. The apparatus comprises first means operable for moving the steering wheel in a first direction toward the uppermost position and in a second direction toward the lowermost position, second means having a control member movable in first and second directions for producing a signal indicating a desired steering wheel position change corresponding to an extent to which the control member is moved and a desired direction corresponding to a direction in which the control member is moved, and a control unit responsive to the signal from the second means for operating the first means to move the steering wheel int he desired direction. The control unit includes means for setting a length of time based upon the desired steering wheel position change, and means for operating the first means for the time length to make the desired steering wheel position change.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
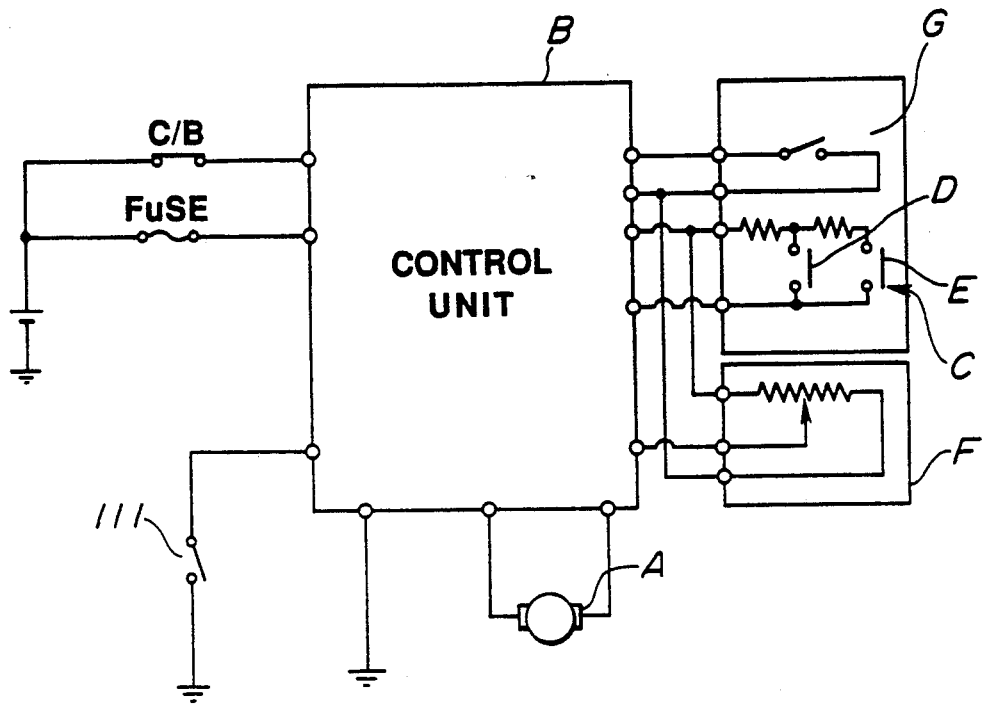
FIG. 1 is a schematic diagram of a steering wheel position control apparatus on which the invention is an improvement.

Prior to the description of the preferred embodiments of the present invention, a steering wheel position control apparatus of FIG. 1 on which the present invention is an improvement is briefly described in order to provide a basis for a better understanding of the difficulties attendant thereon.

Figure 2:
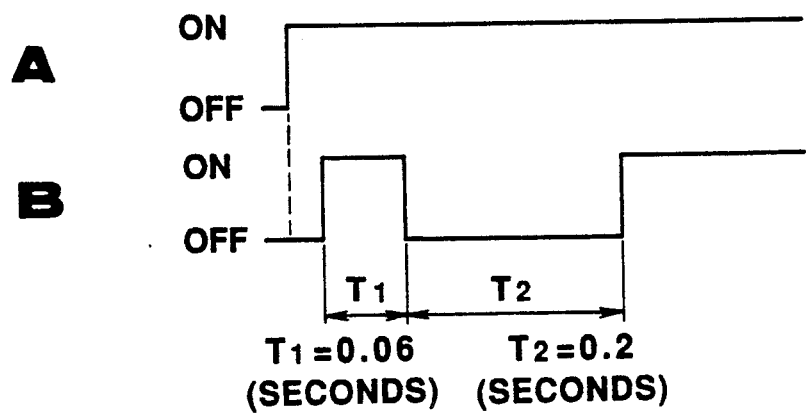
FIG. 2 contains waveforms A and B used in explaining the operation of the steering wheel position control apparatus of FIG. 1.

The steering wheel position control apparatus comprises an electric reversible motor A, a manual switch C and a control unit B connected between the electric motor A and the manual switch C. The manual switch C includes up and down push-button switches D and E. The control unit B starts rotating the electric motor A in a direction to move the steering wheel toward its uppermost position when the up switch D is depressed and it stops the electric motor A from rotating in the direction when the up switch D is released. The final position of the steering wheel is indicated by a potentiometer F and stored in the control unit B. The control unit B starts rotating the electric motor A in a reversed direction to move the steering wheel toward its lowermost position when the down switch E is depressed and it stops the electric motor A from rotating in the reversed direction when the down switch E is released. The final position of the steering wheel is indicated by the potentiometer F and stored in the control unit B. In order to provide fine steering wheel position adjustment, the control unit B produces an electric pulse having a predetermined width T1 of 0.06 seconds during which the electric motor A is driven each time one of the up and down push-button switches D and E is depressed, as shown by the waveforms A and B of FIG. 2. The steering wheel position control apparatus also includes an auto switch G connected to the control unit B. The control unit B is arranged to control the electric motor A to bring the steering wheel to its uppermost position when the ignition key is extracted from the steering column key receptacle with the auto switch G being turned on. The control unit B controls the electric motor A to return the steering wheel to a position stored therein when the ignition key is placed into the steering column key receptacle again.

In order to provide quick motion of the steering column from its uppermost position to the stored position, it is required to increase the speed of rotation of the electric motor A. However, an increased electric motor speed results in a difficulty in making fine adjustment of the steering wheel position. This dilemma was solved by producing an electric pulse having a predetermined width to the electric motor each time a manual switch is depressed, as described previously. However, this solution arises another problem that the steering wheel position fine adjustment cannot be made smoothly with ease. The invention can satisfy the requirements for quick steering wheel motion and ease and smooth steering wheel position fine adjustment by setting a length of time during which the electric motor is to be driven based upon a required degree of movement of the steering wheel.

Figure 3:
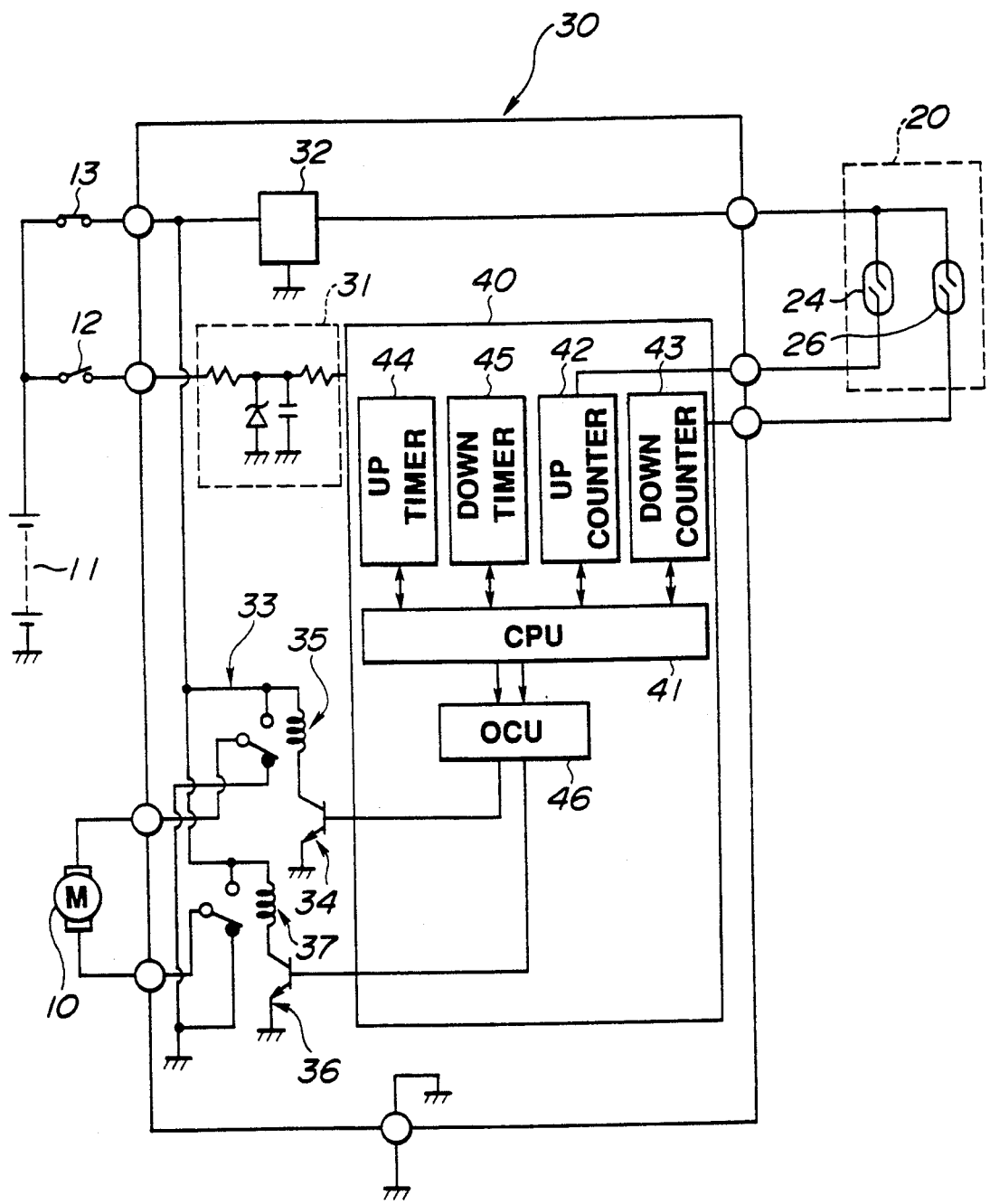
FIG. 3 is a schematic diagram showing a first embodiment of a steering wheel position control apparatus made in accordance with the invention.

Referring to FIG. 3, there is shown a first embodiment of a steering wheel position control apparatus made in accordance with the invention. The steering wheel position control apparatus comprises an electric reversible motor 10, a manual switch 20, and a control unit 30 coupled between the electric motor 10 and the manual switch 20 for controlling the electric motor 10 in response to a driver's operation of the manual switch 20.

Figure 4:
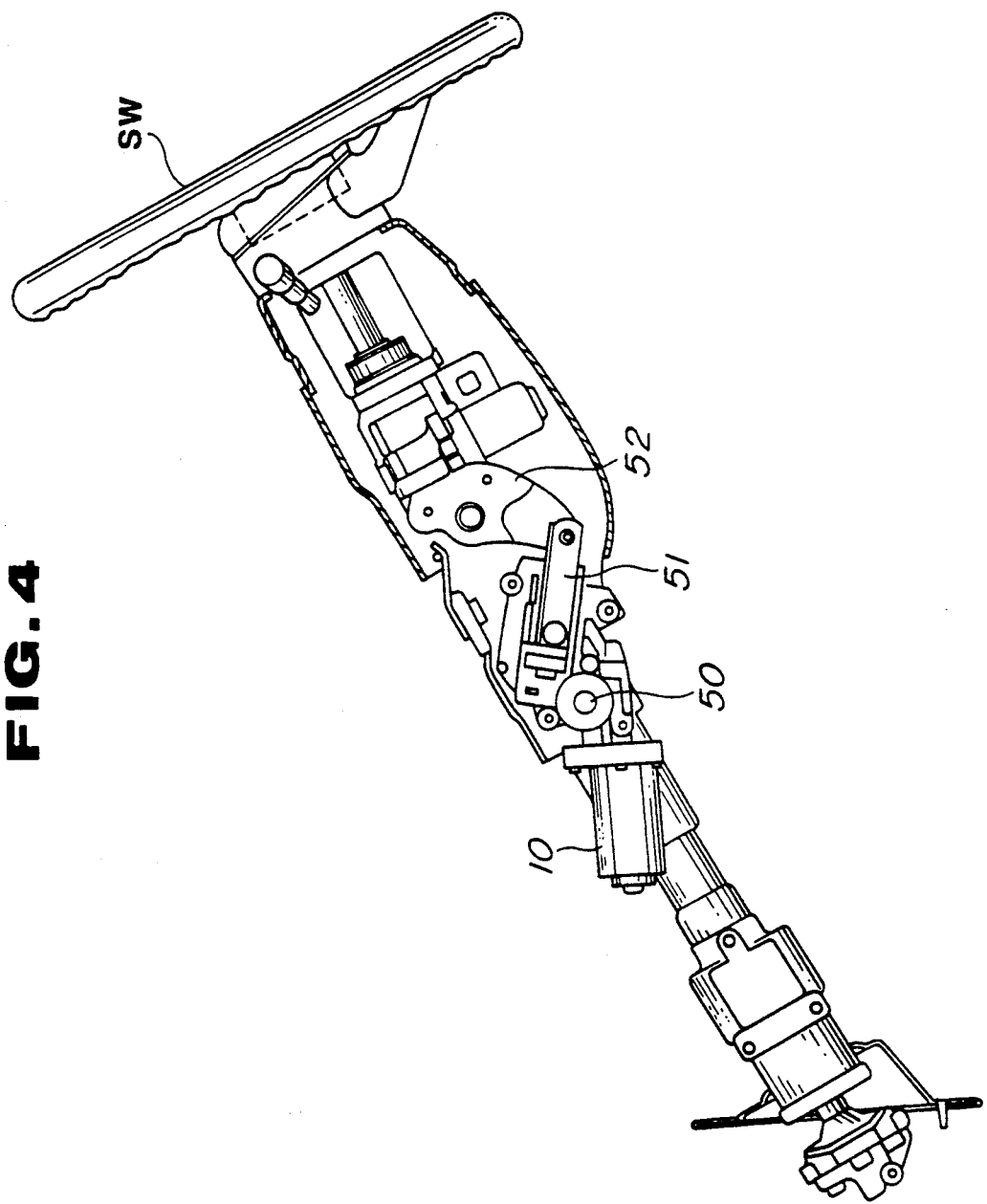
FIG. 4 is a sectional view showing the steering wheel driving assembly used in the steering wheel position control apparatus of FIG. 3.
Figure 5:
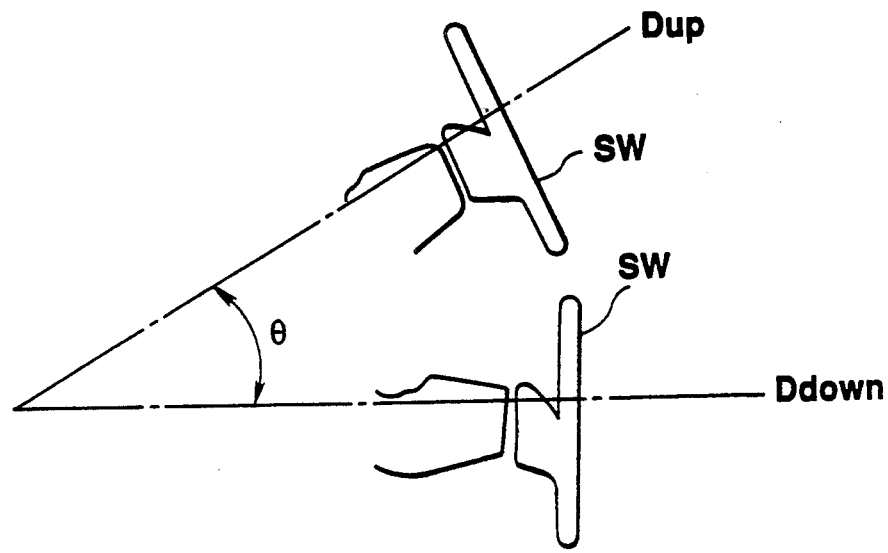
FIG. 5 is a schematic diagram used in explaining the uppermost and lowermost positions of the steering wheel.

Referring to FIG. 4, the electric motor 10 is mechanically coupled through a reduction gear mechanism 50 to a slider 51. The slider 51 is coupled to an upper bracket 52. The slider 51 moves forward and rearward to swing the steering wheel SW upward and downward between its uppermost position Dup and its lowermost position Ddown, as shown in FIG. 5, with rotation of the electric motor 10 in forward and reverse directions.

Figure 6:
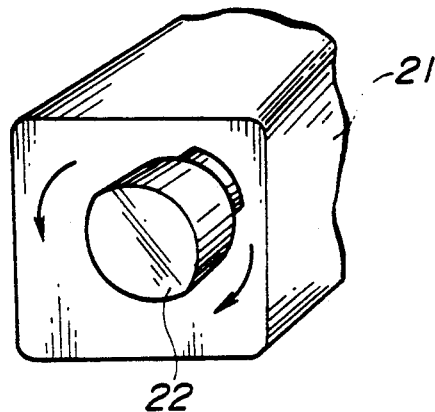
FIG. 6 is a perspective view showing the operation knob used in the steering wheel position control apparatus of FIG. 3.
Figure 7:
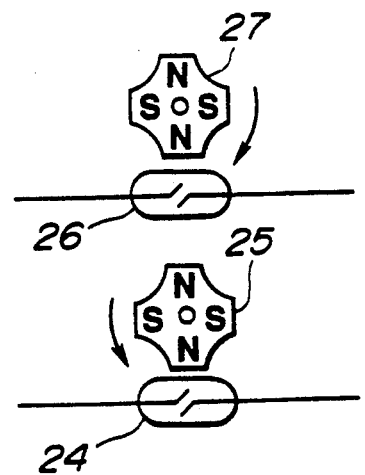
FIG. 7 is a diagram showing the manual switch used in the steering wheel position control apparatus of FIG. 3.

As shown in FIGS. 6 and 7, the manual switch 20 includes up and down switches housed in a switch box 21 mounted on the vehicle instrument panel, console, steering column, or the like. An unshown shaft, which has an operation knob 22 fixed thereon, is journalled on the switch box 21 for rotation in clockwise and counter-clockwise directions. The up switch includes a need switch 24 and a rotary magnet 25 positioned adjacent to the need switch 24. The rotary magnet 25 has a plurality of equally spaced magnetic poles N and S arranged in such a way that respective adjacent magnetic poles are of opposite polarity, as best shown in FIG. 7. The rotary magnet 25 is mounted on the shaft for rotation with counter-clockwise rotation of the operation knob 22. The need switch 24 closes when it faces one of the magnetic poles S and opens when it faces one of the magnetic poles N. The number of the magnetic poles is selected to close the need switch 24 a predetermined number of times (in the illustrated case twice) at one degree of counter-clockwise rotation of the operation knob 22.

Similarly, the down switch includes a need switch 26 and a rotary magnet 27 positioned adjacent to the need switch 26. The rotary magnet 27 has a plurality of equally spaced magnetic poles N and S arranged in such a way that respective adjacent magnetic poles are of opposite polarity, as best shown in FIG. 7. The rotary magnet 27 is mounted on the shaft for rotation with clockwise rotation of the operation knob 22. The need switch 26 closes when it faces one of the magnetic poles S and opens when it faces one of the magnetic poles N. The number of the magnetic poles is selected to close the need switch 26 a predetermined number of times (in the illustrated case twice) at one degree of clockwise rotation of the operation knob 22.

Returning to FIG. 3, the control unit 30 employs a digital computer 40 which includes a central processing unit (CPU) 41, an up counter 42, a down counter 43, an up timer 44, a down timer 45 and an output control unit (OCU) 46. The central processing unit 41 communicates with the rest of the computer via data bus. The digital computer 40 is powered from a constant-voltage regulated power circuit 31 connected through an ignition switch 12 to the vehicle battery 11. The vehicle battery 11 is also connected through a manual switch 13 to a constant-voltage regulated power circuit 32 for supplying a constant voltage to one terminals of the respective need switches 24 and 26. The need switch 24 produces, at the other terminal thereof, a series of electric pulses each corresponding to half of one degree of rotation of the operation knob 22 when the driver rotates the operation knob 22 in the counter-clockwise direction. The need switch 26 produces, at the other terminal thereof, a series of electric pulses corresponding to half of one degree of rotation of the operation knob 22 when the driver rotates the operation knob 22 in the clockwise direction.

The up counter 42 is connected to the need switch 24 for counting electric pulses fed thereto from the need switch 24. The count accumulated in the up counter 42 is equal to the number of electric pulses applied from the need switch 24. The central processing unit 41 reads the count of the up counter 42 and calculates a length of time T1 during which the electric motor 10 is to be driven based upon the count of the up counter 42. The central processing unit 41 sets the calculated time length T1 on the up timer 44. The output control circuit 46 operates on command from the central processing unit 41 to produce a control signal to a motor drive circuit 33 for driving the electric motor 10 in a direction inclining the steering wheel toward its uppermost position for the time length T1 calculated by the computer.

Similarly, the down counter 43 is connected to the need switch 26 for counting electric pulses fed thereto from the need switch 26. The count accumulated in the down counter 43 is equal to the number of electric pulses applied from the need switch 26. The central processing unit 41 reads the count of the down counter 44 and calculates a length of time T2 during which the electric motor 10 is to be driven based upon the count of the down counter 43. The central processing unit 41 sets the calculated time length T2 on the down timer 44. The output control circuit 46 operates on command from the central processing unit 41 to produce a control signal to a motor drive circuit 33 for driving the electric motor 10 in a direction inclining the steering wheel toward its lowermost position for the time length T2 calculated by the computer.

The motor drive circuit 33 includes first and second switching transistors 34 and 36. The first transistor 34 responds to a control signal from the output control unit 46 by connecting a relay coil 35 to the vehicle battery 11 to drive the electric motor 10 in a direction inclining the steering wheel SW toward its uppermost position. The second transistor 36 responds to a control signal from the output control unit 46 by connecting a relay coil 37 to the vehicle battery 11 to drive the electric motor 10 in a direction inclining the steering wheel SW toward its lowermost position.

Figure 8:
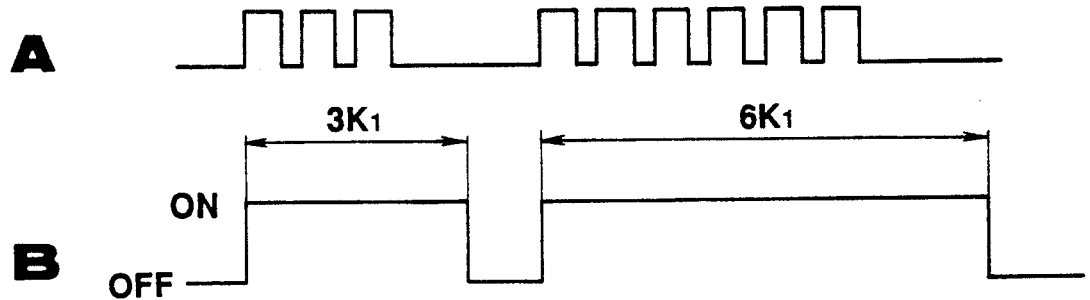
FIG. 8 contains waveforms A and B used in explaining the operation of the steering wheel position control apparatus of FIG. 3.

The operation is as follows: The control unit 30 is powered when the ignition switch 12 is turned on. To move the steering wheel SW toward its uppermost position Dup, the driver may rotate the operation knob 22 in a counter-clockwise direction causing the need switch 24 to produce electric pulses to the up counter 42, as shown by the waveform A of FIG. 8. The number of these electric pulses corresponds to the angle of counter-clockwise rotation of the operation knob 22.

The central processing unit 41 reads the count accumulated in the up counter 42 and calculates a time length T1 and T1=n×K1 where n is the count of the up counter 42 and K1 is a first constant. The central processing unit 41 sets the calculated time length T1 on the up timer 44. The central processing unit 41 produces a command causing the output control unit 46 to produce a control signal, as shown by the waveform B of FIG. 8, so as to turn the switching transistor 34 on for the time length T1 calculated by the computer. As a result, the electric motor 10 rotates in a direction inclining the steering wheel SW toward its uppermost position Dup for the calculated time length T1. Preferably, the central processing unit 41 responds to the first electrical pulse fed from the need switch 24 by producing a command causing the output control unit 46 to produce the control signal. In this case, the central processing unit 41 adds a value equal to the first constant K1 to the residual count of the up timer 44 in response to each of the successive electric pulses from the need switch 24. When the up timer 44 is timed out, the central processing unit 41 interrupts the command to the output control unit 46 so as to stop the electric motor 10.

The amount Lup of movement of the steering wheel SW toward its uppermost position Dup is given as $$Lup = Vup \times n \times K1$$

where Vup is the speed of rotation of the electric motor 10 in the direction inclining the steering wheel SW toward its uppermost position Dup.

Figure 9:
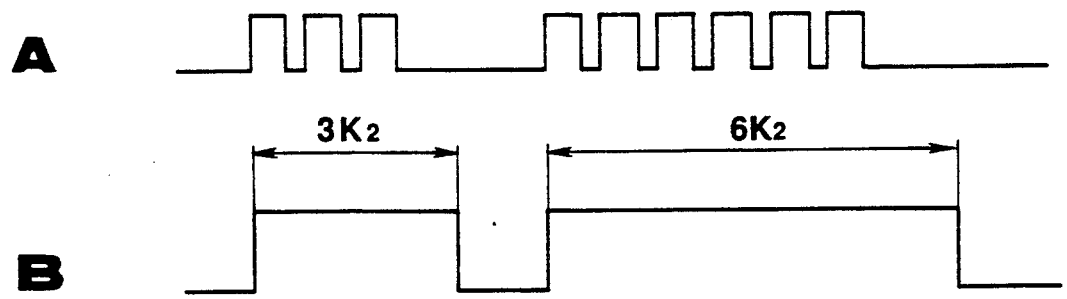
FIG. 9 contains waveforms A and B used in explaining the operation of the steering wheel position control apparatus of FIG. 3.

To move the steering wheel SW toward its lowermost position Ddown, the driver may rotate the operation knob 22 in a clockwise direction causing the reed switch 26 to produce electric pulses to the down counter 43, as shown by the waveform A of FIG. 9. The number of these electric pulses corresponds to the angle of clockwise rotation of the operation knob 22. The central processing unit 41 reads the count accumulated in the down counter 43 and calculates a time length T2 as T2=n×K2 where n is the count of the down counter 43 and K2 is a second constant. The central processing unit 41 sets the calculated time length T2 on the down timer 45. The central processing unit 41 produces a command causing the output control unit 46 to produce a control signal, as shown by the waveform B of FIG. 9, so as to turn the switching transistor 36 on for the time length T2 calculated by the computer. As a result, the electric motor 10 rotates in a direction inclining the steering wheel SW toward its lowermost position Ddown for the calculated time length T2. Preferably, the central processing unit 41 responds to the first electrical pulse fed from the reed switch 26 by producing a command causing the output control unit 46 to produce the control signal to the switching transistor 36. In this case, the central processing unit 41 adds a value equal to the second constant K2 to the residual count of the down timer 45 in response to each of the successive electric pulses from the reed switch 26. When the down timer 45 is timed out, the central processing unit 41 interrupts the command to the output control unit 46 so as to stop the electric motor 10.

The amount Ldown of movement of the steering wheel SW toward its lowermost position Ddown is given as $$Ldown = Vdown = n \times K2$$

where Vdown is the speed of rotation of the electric motor 10 in the direction inclining the steering wheel SW toward its lowermost position Ddown.

Normally, the speed Vup is less than the speed Vdown because of the weight of the steering column. In order to equalize the amounts Lup and Ldown of rotation of the steering wheel SW for the same angle of rotation of the operation knob 22, the first and second constants K1 and K2 are selected to establish a condition of K1/K2=Vdown/Vup.

The steering wheel position change is proportional to an extent to which the operation knob 22 rotates. The driver can move the steering wheel to a desired position merely by setting the rotary knob 22 to a corresponding position. It is not required for the driver to leave his hand on the operation knob 22.

Figure 10:
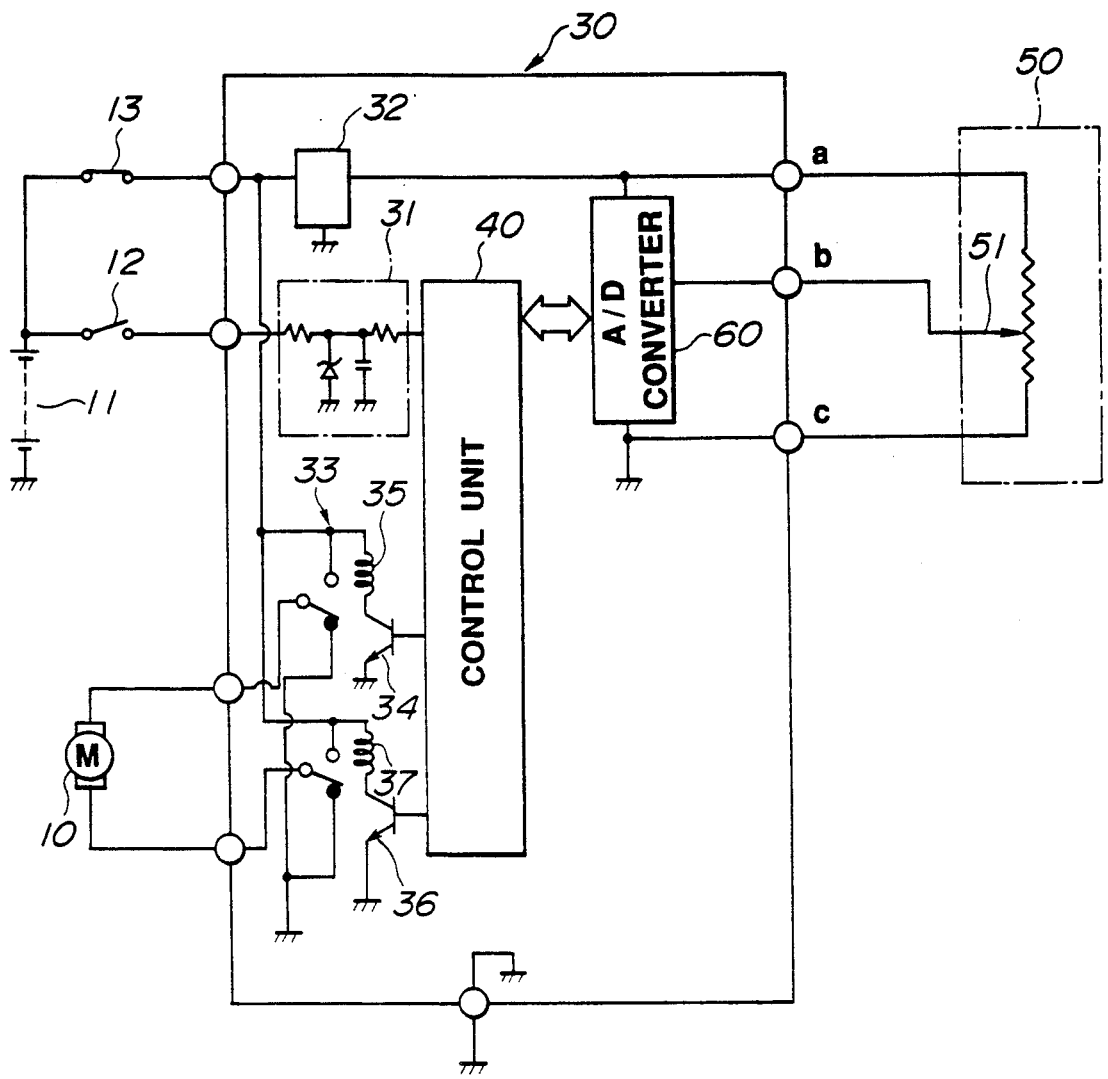
FIG. 10 is a schematic diagram showing a second embodiment of the steering wheel position control apparatus of the invention.
Figure 11:
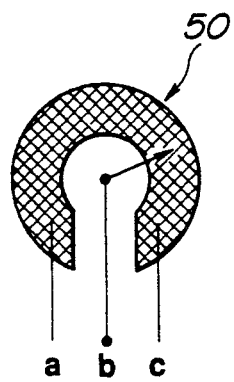
FIG. 11 is a schematic diagram showing the variable resistor used in the steering wheel position control apparatus of FIG. 10.

Referring to FIGS. 10 and 11, there is illustrated a second embodiment of the steering wheel position control apparatus of the invention. Like reference numerals have been applied to FIG. 10 with respect to the equivalent components shown in FIG. 3.

In this embodiment, the reed switch type manual switch 20 is removed and replaced with a variable resistor 50 connected between the constant-voltage regulated power circuit 32 and electrical ground. The resistance of the variable resistor 50 is a function of the extent to which the operation knob 22 is rotated. A slider 51 is operatively connected to the operation knob 22 to change the resistance value of the variable resistor 50 as the operation knob 22 is rotated in the clockwise or counter-clockwise direction. The variable resistor 51 produces a voltage proportional to the angle of rotation of the operational knob 22. The voltage signal is applied to an analog-to-digital computer 60 which converts it into digital form for application to the control unit 40. The control unit 40 employs a digital computer for calculating a change of the resistance of the variable resistor 50 and sets a length of time during which the electric motor 10 is to be driven to move the steering wheel SW between its uppermost and lowermost positions Dup and Ddown.

Figure 12:
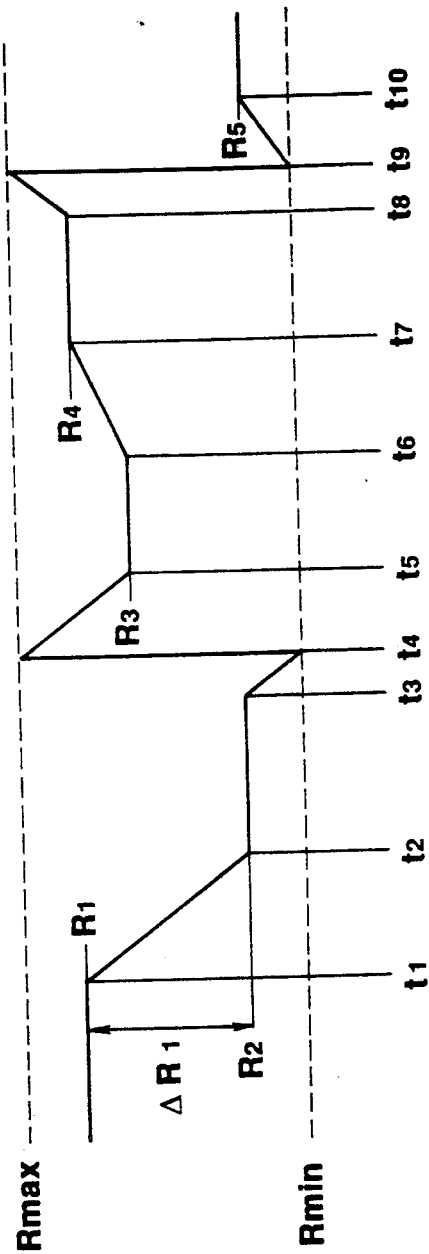
FIG. 12 is a diagram used in explaining the operation of the steering wheel position control apparatus of FIG. 10.

Referring to FIG. 12, the operation of the steering wheel position control apparatus will be described.

It is now assumed that the resistance of the variable resistor 50 decreases when the operation knob 22 rotates in the counter-clockwise direction demanding movement of the steering wheel SW toward its uppermost position Dup and increases when the operation knob 22 rotates in the clockwise direction demanding movement of the steering wheel SW toward its lowermost position Ddown. The amount L of movement of the steering wheel SW is given as $$L = V \times \tau = V \times \Delta R \times K$$

where V is the speed of rotation of the electric motor 10, $\tau$ is the length of time during which the electric motor 10 is to be driven, $\Delta R$ is a change of the resistance of the variable resistor 50, and K is a constant.

When the driver initiates counter-clockwise rotation of the operation knob 22 at time t1 and terminates the counter-clockwise rotation of the operation knob 22 at time t2, the resistance of the variable resistor 50 decreases from a value R1 to a value R2. This resistance change $\Delta R1$ is given as $$\Delta R1 = R1 - R2$$

The resistance change $\Delta R1$ is positive and it indicates a driver's demand for movement of the steering wheel SW toward its uppermost position Dup. The central processing unit calculates a length of time $\tau$ during which the electric motor 10 is to be driven as $$\tau = \Delta R1 \times Kup$$

where Kup is a constant. The central processing unit produces a command causing the electric motor 10 to move the steering wheel SW towards its uppermost position for the time length $\tau$ calculated by the computer. The amount Lup of movement of the steering wheel SW is given as $$Lup = Vup \times \Delta R1 \times Kup$$

where Vup is the speed of rotation of the electric motor 10 in the direction moving the steering wheel SW toward its uppermost position Dup.

When the driver initiates counter-clockwise rotation of the operation knob 22 at time t3 and terminates the counter-clockwise rotation of the operation knob 22 at time t5, the resistance of the variable resistor 50 decreases from the value R2 to a minimum possible value Rmin (time t4) and then decreases from a maximum possible value Rmax (time t4) to a value R3. This resistance change $\Delta R2$ is given as $$\Delta R2 \times (R2 - Rmin) + (Rmax - R3)$$

The resistance change $\Delta R2$ is positive and it indicates a driver's demand for movement of the steering wheel SW toward its uppermost position Dup. The central processing unit calculates a length of time $\tau$ during which the electric motor 10 is to be driven as $$\tau = \Delta R2 \times Kup$$

The central processing unit produces a command causing the electric motor 10 to move the steering wheel SW towards its uppermost position for the time length $\tau$ calculated by the computer. The amount Lup of movement of the steering wheel SW is given as $$Lup = Vup \times \Delta R2 \times Kup$$

When the driver initiates clockwise rotation of the operation knob 22 at time t6 and terminates the clockwise rotation of the operation knob 22 at time t7, the resistance of the variable resistor 50 increases from the value R3 to a value R4. This resistance change $\Delta R3$ is given as $$\Delta R3 = R3 - R4$$

The resistance change $\Delta R3$ is negative and it indicates a driver's demand for movement of the steering wheel SW toward its lowermost position Ddown. The central processing unit calculates a length of time $\tau$ during which the electric motor 10 is to be driven as $$\tau = |\Delta R3| \times Kdown$$

where Kdown is a constant. The central processing unit produces a command causing the electric motor 10 to move the steering wheel SW towards its lowermost position for the time length $\tau$ calculated by the computer. The amount Ldown of movement of the steering wheel SW is given as $$Ldown = Vdown \times |\Delta R3| \times Kdown$$

Where Vdown is the speed of rotation of the electric motor 10 in the direction moving the steering wheel SW toward its lowermost position.

When the driver initiates clockwise rotation of the operation knob 22 at time t8 and terminates the clockwise rotation of the operation knob 22 at time t10, the resistance of the variable resistor 50 increases from the value R4 to the maximum possible value Rmax and then increases from the minimum possible value Rmin to a value R5. This resistance change $\Delta R4$ is given as $$\Delta R4 = (R4 - Rmax) + (Rmin - R5)$$

The resistance change $\Delta R4$ is negative and it indicates a driver's demand for movement of the steering wheel SW toward its lowermost position Dup. The central processing unit calculates a length of time $\tau$ during which the electric motor 10 is to be driven as $$\tau = |\Delta R4| \times Kdown$$

The central processing unit produces a command causing the electric motor 10 to move the steering wheel SW towards its uppermost position for the time length $\tau$ calculated by the computer. The amount Ldown of movement of the steering wheel SW is given as $$Ldown = Vdown \times |\Delta R4| \times Kdown$$

The speed Vup is less than the speed Vdown because of the weight of the steering column. In order to equalize the amounts of Lup and Ldown of rotation of the steering wheel SW for the same angle of rotation of the operation knob 22, the first and second constants Kup and Kdown are selected to establish a condition of Vup/Vdown = Kdown/Kup.

What is claimed is:

1. A steering wheel position control apparatus for use with an automotive vehicle having a steering wheel supported for movement between uppermost and lowermost positions, comprising:
   first means operable for moving the steering wheel in a first direction toward the uppermost position and in a second direction toward the lowermost position;
   second means having a control member movable in first and second directions for producing a signal indicating a desired steering wheel position change corresponding to an extent to which the control member is moved and a desired direction corresponding to a direction in which the control member is moved; and
   a control unit responsive to the signal from the second means for operating the first means to move the steering wheel in the desired direction, the control unit including means for setting a length of time based upon the desired steering wheel position change, and means for operating the first means for the time length to make the desired steering wheel position change.

2. The steering wheel position control apparatus as claimed in claim 1, wherein the control unit includes means for setting the time length to make equal steering wheel positions changes in the first and second directions for the same extents of movement of the control member in the first and second directions.

3. The steering wheel position control apparatus as claimed in claim 1, wherein the second means includes a rotary member rotatable in first and second positions, first pulse generator means for producing first pulses the number of which corresponds to an extent to which the rotary member rotates in the first direction, second pulse generator means for producing second pulses the number of which corresponds to an extent to which the rotary member rotates in the second direction, means for setting a first time length T1 as $T1 = N \times K1$ where N is the number of first pulses produced from the first pulse generator means and K1 is a constant, means for setting a second time length T2 as $T2 = N \times K1$ where N is the number of second pulses produced from the second pulse generator means and K2 is a constant, means for operating the first means for the first time length to make the desired steering wheel position change in the first direction, and means for operating the first means for the second time length to make the desired steering wheel position change in the second direction.

4. The steering wheel position control apparatus as claimed in claim 3, wherein the constants K1 and K2 are selected to establish a condition of $K1/K2 = V2/V1$ where V1 is a speed at which the first means moves the steering wheel in the first direction and V2 is a speed at which the first means moves the steering wheel in the second direction.

5. The steering wheel position control apparatus as claimed in claim 1, wherein the second means includes a rotary member rotatable in first and second positions, means for producing an electric signal having a first magnitude corresponding to an extent to which the rotary member rotates in the first direction and a second magnitude corresponding to an extent to which the rotary member rotates in the second direction, means for detecting a change $\Delta R1$ of the first signal to set a first time length T1 as $T1 = \Delta R1 \times K1$ where K1 is a constant, means for detecting a change $\Delta R2$ of the second signal to set a second time length T2 as $T2 = \Delta R2 \times K2$ where K2 is a constant, means for operating the first means for the first time length T1 to make the desired steering wheel position change in the first direction, and means for operating the first means for the second time length T2 to make the desired steering wheel position change in the second direction.

6. The steering wheel position control apparatus as claimed in claim 5, wherein the constants K1 and K2 are selected to establish a condition of $K1/K2 = V2/V1$ where V1 is a speed at which the first means moves the steering wheel in the first direction and V2 is a speed at which the first means moves the steering wheel in the second direction.

7. A steering wheel position control apparatus for use with an automotive vehicle having a steering wheel supported for movement between uppermost and lowermost positions, comprising:

an electric motor operable for moving the steering wheel in a first direction toward the uppermost position and in a second direction toward the lowermost position;

a switch sensitive to a steering wheel position change for producing a signal indicative of a sensed steering wheel position;

means coupled to the switch for setting a length of time based upon the steering wheel position change indication signal; and means for operating the electric motor for the set length of time.

* * * * *